US009734333B2

(12) United States Patent
Teal

(10) Patent No.: US 9,734,333 B2
(45) Date of Patent: Aug. 15, 2017

(54) INFORMATION SECURITY TECHNIQUES INCLUDING DETECTION, INTERDICTION AND/OR MITIGATION OF MEMORY INJECTION ATTACKS

(71) Applicant: Heat Software USA Inc., Milpitas, CA (US)

(72) Inventor: Daniel Teal, Austin, TX (US)

(73) Assignee: HEAT SOFTWARE USA INC., Milpitas, CA (US)

(*) Notice: Subject to any disclaimer, the term of this patent is extended or adjusted under 35 U.S.C. 154(b) by 463 days.

(21) Appl. No.: 13/841,245

(22) Filed: Mar. 15, 2013

(65) Prior Publication Data

US 2013/0290662 A1    Oct. 31, 2013

Related U.S. Application Data

(60) Provisional application No. 61/625,544, filed on Apr. 17, 2012, provisional application No. 61/625,541, filed on Apr. 17, 2012.

(51) Int. Cl.
*G06F 21/56* (2013.01)
*G06F 12/14* (2006.01)
*G06F 21/52* (2013.01)
*G06F 9/445* (2006.01)

(52) U.S. Cl.
CPC ............ *G06F 21/566* (2013.01); *G06F 12/14* (2013.01); *G06F 21/52* (2013.01); *G06F 9/44521* (2013.01)

(58) Field of Classification Search
CPC ........ G06F 12/14; G06F 21/52; G06F 21/566; G06F 21/56; G06F 9/44521; H04L 63/1416; H04L 63/1408; H04L 63/145; H04L 63/1441
See application file for complete search history.

(56) References Cited

U.S. PATENT DOCUMENTS

| 5,657,475 A * | 8/1997 | Gillespie ............. G06F 12/1441 711/152 |
| 6,301,668 B1 | 10/2001 | Gleichauf et al. ............... 726/25 |
| 6,477,651 B1 | 11/2002 | Teal ............................... 726/23 |
| 6,499,107 B1 | 12/2002 | Gleichauf et al. ............... 726/13 |
| 7,398,389 B2 | 7/2008 | Teal et al. ...................... 713/164 |
| 7,711,952 B2 | 5/2010 | Teal et al. ...................... 713/156 |

(Continued)

FOREIGN PATENT DOCUMENTS

| EP | 2065825 | 6/2009 |
| EP | 2653994 | 10/2013 |

OTHER PUBLICATIONS

Kumar, Eric Uday. "User-mode meory scanning on 32-bit & 64-bit windows". Springer-Verlag. Published online Jul. 10, 2008.*

(Continued)

*Primary Examiner* — Ann J Lo
*Assistant Examiner* — Jane Wei

(57) ABSTRACT

Methods of detecting malicious code injected into memory of a computer system are disclosed. The memory injection detection methods may include enumerating memory regions of an address space in memory of computer system to create memory region address information. The memory region address information may be compared to loaded module address information to facilitate detection of malicious code memory injection.

21 Claims, 14 Drawing Sheets

(56) References Cited

U.S. PATENT DOCUMENTS

| | | | | |
|---|---|---|---|---|
| 8,572,739 | B1* | 10/2013 | Cruz | G06F 21/566 726/22 |
| 2006/0230388 | A1* | 10/2006 | Hatlelid | G06F 21/52 717/127 |
| 2006/0230451 | A1* | 10/2006 | Kramer | G06F 21/56 726/22 |
| 2007/0078915 | A1* | 4/2007 | Gassoway | G06F 21/562 |
| 2009/0049550 | A1* | 2/2009 | Shevchenko | G06F 21/56 726/23 |
| 2009/0300263 | A1* | 12/2009 | Devine | G06F 12/1009 711/6 |
| 2011/0179430 | A1* | 7/2011 | Kim | G06F 9/44521 719/331 |
| 2011/0277033 | A1* | 11/2011 | Ramchetty | G06F 21/566 726/24 |
| 2012/0255002 | A1* | 10/2012 | Sallam | G06F 21/566 726/23 |
| 2013/0305366 | A1* | 11/2013 | Lim | G06F 21/566 726/23 |

OTHER PUBLICATIONS

Dolan-Gavitt, Brendan. "The VAD tree: a process-eye view of physical memory". MITRE Corporation. 2007.*

Kumar, Eric Uday. "User-mode memory scanning on 32-bit & 64-bit windows". Springer-Verlag. Published online Jul. 10, 2008.*

Stack Overflow Forum. "What is the difference between reserved and committed memory?" Posts made by Greg Hewgill on Mar. 13, 2010 and Jul. 27-28, 2011.*

Fewer, Stephen. "Reflective DLL Injection." Harmony Security. Oct. 21, 2008. Also available at http://www.harmonysecurity.com/files/HS-P005_ReflectiveDllInjection.pdf.*

Unpublished (non-publication request), commonly-owned U.S. Appl. No. 12/695,816 (Teal et al.), filed Jan. 28, 2010.

Unpublished (non-publication request), commonly-owned U.S. Appl. No, 12/419,932 (Teal et al.), filed Apr. 7, 2009.

Fewer, S., *Reflective DLL Injection*, 7 pages, Copyright © 2008 Harmony Security, Oct. 31, 2008.

Skape and JT, *Remote Library Injection*, pp. 1-38, Apr. 6, 2004.

Anonymous, "Find Injected DLLS in a Process?" Feb. 11, 2008, retrieved from the internet at http://cboard.cprogramming.com/windows-programming/110979-find-injected-dlls-process-printable-thread.html?pp=80, on Aug. 31, 2015, pp. 1-26.

Ligh, M. H., "Locating Hidden Clampi DLLSs (VAD-style)", Nov. 2, 2008, retrieved from the internet at at http://mnin.blogspot.de/2008/11/locating-hidden-clampi-dlls-vad-style.html, on Sep. 1, 2015, pp. 1-4.

Walters, A., "FATKit: Detecting Malicious Library Injection and Upping the "Anti"", Jul. 31, 2006, retrieved from the internet at http://4tphi.net/fatkit/papers/fatkit_dll_rc3.pdf on Sep. 1, 2015, pp. 1-12.

European Search Report, dated Sep. 10, 2015, from related European Patent Application No. EP13163780.3.

European Examination Report for Application No. 13 163 780.3 -1870 dated Feb. 22, 2017.

Anonymous, "Locating Hidden Clampi DLLs (VAD-Style) second figure suspicious.png (image)", Nov. 2, 2008. Retrieved from the Internet: http://3.bp.blogspot.com/_jAVGHwajDek/SQ4Nsnswlml/AAAAAABFg/s9lzLA8dmDY/s1600-h/suspicious.png Retrieved on Feb. 14, 2017.

Anonymous, "Locating Hidden Clampi DLLs (VAD-syle) third figure winsock.png", Nov. 2, 2008. Retrieved from the Internet: http://1.bp.blogspot.com/_jAVGHwajDek/SQ4WaVNjsWl/AAAAAABFw/15MIkFGDEx4/s1600-h/winsock.png Retrieved on Feb. 14, 2017.

* cited by examiner address 1
.
.
.
.
.
.
.
.
.
.
.
.
address Y

INFORMATION SECURITY TECHNIQUES INCLUDING DETECTION, INTERDICTION AND/OR MITIGATION OF MEMORY INJECTION ATTACKS

CROSS-REFERENCE TO RELATED APPLICATION(S)

This patent application claims priority to U.S. Provisional Patent Application No. 61/625,544, entitled "INFORMATION SECURITY TECHNIQUES INCLUDING LIBRARY INDICATIVE INFORMATION ENCODING CHECK FOR DETECTION, INTERDICTION AND/OR MITIGATION OF MEMORY INJECTION ATTACKS", filed Apr. 17, 2012, and U.S. Provisional Patent Application No. 61/625,541, entitled "INFORMATION SECURITY TECHNIQUES INCLUDING VALID MAPPING CHECKS FOR DETECTION, INTERDICTION AND/OR MITIGATION OF MEMORY INJECTION ATTACKS" filed Apr. 17, 2012. Each of the above-identified patent applications is herein incorporated by reference in its entirety.

BACKGROUND

Modern information systems (including desktop and portable computers, servers, mobile devices and even media devices and information appliances) often exhibit vulnerabilities to attacks that seek to exploit a flaw or weakness in the system's design, implementation, or operation and management. Many conventional security solutions employ one of two foundational techniques: blacklisting and whitelisting.

SUMMARY OF THE DISCLOSURE

Broadly, the present disclosure relates to information processing system security, and more specifically, to computer implemented security techniques that may be employed to detect, interdict and/or mitigate certain classes of malware including memory injections.

In one aspect, a method for detecting memory injections includes enumerating, based on a query of an operating executive of a computer system, a plurality of memory regions of an address space in memory of the computer system, thereby creating memory region address information. The method further includes scanning memory of the computer system for a memory injection. The scanning step may comprise determining whether a first memory region of the plurality of memory regions corresponds to any of a plurality of loaded modules registered with the operating executive; wherein, when the first memory region does not correspond to any of the plurality of loaded modules, determining whether the first memory region contains library indicative coding; and wherein, when the first memory region contains library indicative coding, generating a first memory injection alarm. The step of determining whether the first memory region corresponds to any of the loaded modules may include one or both of: examining the plurality of loaded modules for loaded module address information; and comparing the memory region address information associated with the first memory region to the loaded module address information. The comparing and the determining steps may be performed in kernel code.

In one embodiment, when the first memory region corresponds to one of the plurality of loaded modules, the method for detecting memory injection may include determining whether that loaded module is mapped from a file system of the computer system. In other embodiments, when the loaded module is not mapped from a file system of the computer system, the method may include determining whether the first memory region contains library indicative coding and/or generating a second memory injection alarm.

In one embodiment, the first memory injection alarm may be indicative of a Reflective DLL memory injection and/or the second memory injection alarm may be indicative of a Skape/JT memory injection.

In one embodiment, a method for detecting memory injections includes enumerating, based on a query of an operating executive of the computer system, a plurality of memory regions of an address space in memory of the computer system, thereby creating memory region address information. The method further includes scanning memory of the computer system for a memory injection. The scanning step may comprise determining whether a first memory region of the plurality of memory regions corresponds to any of a plurality of loaded modules registered with the operating executive; wherein, when the first memory region corresponds to one of the plurality of loaded modules, determining whether that loaded module is mapped from a file system of the computer system; and wherein, when the loaded module is not mapped from a file system of the computer system, generating a memory injection alarm. The step of determining whether the first memory region corresponds to any of the loaded modules may include one or both of: examining the plurality of loaded modules for loaded module address information; and comparing the memory region address information associated with the first memory region to the loaded module address information. The comparing and the determining steps may be performed in kernel code.

In one embodiment, the scanning step may include determining whether the first memory region is in use by checking whether the first memory is committed memory, and when the first memory region is in use, determining whether the first memory region corresponds to any of the plurality of loaded modules.

In one embodiment, the scanning step may include determining whether the first memory region is a read/write/executable memory region or was initially allocated as a read/write/executable memory region; and when the first memory region is a read/write/executable memory region or was initially allocated as a read/write/executable memory region, determining whether the first memory region contains library indicative coding.

In one embodiment, the enumerating step may include enumerating the plurality of loaded modules based on the query, thereby creating loaded module address information. For a WINDOWS operating system, enumerating the loaded modules may employ one or more of: the CreateToolhelp32Snapshot function to take a snapshot of all running processes and the modules used by the process; the EnumProcessModules function to obtain a handle to each module in a specified process, then the GetModuleInformation functions to obtain the name, size, and base address of a module; the NtQueryInformationProcess and NtReadVirtualMemory functions to query the virtual memory of a process; and the PsSetloadImageNotifyRoutine function to register a callback function that will be called each time a module is loaded; among others.

In one embodiment, a loaded module may be compared to a first memory region to check for correspondence between the two by comparing loaded module address information to memory region address information. When the addresses of a loaded module span the addresses of the first memory region, or partially overlap the addresses of the first memory region, then the module corresponds to the first memory region. Conversely, when the addresses of a module lie completely outside of the addresses of the first memory region, then the module does not correspond to the first memory region. The comparing step may be performed at successive times during operation of the computer system. In one embodiment, the comparing is substantially limited to those address space regions having a current, or as-allocated, executable type protection attribute, In one embodiment, the operating executive may include at least one of an operating system and a virtualization system or hypervisor.

In one embodiment, process handles for each process executing on the computational system may be obtained. The process handles may be used to query the operating executive to obtain memory region address information for successive memory regions within the address space associated with a process.

In one embodiment, the process handles may be obtained from a shadow process table, wherein entries in the shadow process table are populated in response to the start of new processes or threads. In other embodiments, the process handles may be obtained from a process table maintained by the operating executive.

In one embodiment, the operating executive may be queried to obtain an identifier of a file system object from which the contents of a memory region are mapped.

In one embodiment, the query of the operating executive may comprise walking a call stack. For example, walking a call stack may include using stack commands to view functions currently on the call stack, which represent currently active routines. Thus, navigation of live process may be facilitated by moving from the current frame toward the stop location at the "bottom" of the stack, and vice versa.

Similarly, systems for detection of memory injections are disclosed. In one embodiment, a system for detection of memory injections includes computer executable code, wherein the code includes instructions for enumerating, based on a query of an operating executive of a computer system, a plurality of memory regions of an address space, thereby creating memory region address information. The instructions further include scanning memory of the computer system for a memory injection. The scanning step may comprise determining whether a first memory region of the plurality of memory regions corresponds to any of a plurality of loaded modules registered with the operating executive; wherein, when the first memory region does not correspond to any of the plurality of loaded modules, determining whether the first memory region contains library indicative coding; and wherein, when the first memory region contains library indicative coding, generating a first memory injection alarm. The step of determining whether the first memory region corresponds to any of the loaded modules may include one or both of: examining the plurality of loaded modules for loaded module address information; and comparing the memory region address information associated with the first memory region to the loaded module address information.

In one embodiment, a system for detection of memory injections includes computer executable code, wherein the code includes instructions for enumerating, based on a query of an operating executive of the computer system, a plurality of memory regions of an address space allocated to processes executing on the computer system, thereby creating memory region address information. The instructions further include scanning memory of the computer system for a memory injection. The scanning step may comprise determining whether a first memory region of the plurality of memory regions corresponds to any of a plurality of loaded modules registered with the operating executive; wherein, when the first memory region corresponds to one of the plurality of loaded modules, determining whether that loaded module is mapped from a file system of the computer system; and wherein, when the loaded module is not mapped from a file system of the computer system, generating a memory injection alarm. The step of determining whether the first memory region corresponds to any of the loaded modules may include one or both of: examining the plurality of loaded modules for loaded module address information; and comparing the memory region address information associated with the first memory region to the loaded module address information. The system may be modified to perform any of the processes above.

These and other aspects and advantages, and novel features of this new technology are set forth in part in the description that follows and will become apparent to those skilled in the art upon examination of the following description and figures, or may be learned by practicing one or more embodiments of the technology provided for by the present disclosure,

BRIEF DESCRIPTION OF THE DRAWINGS

FIG. 5b is a schematic view of a security infrastructure for implementing one embodiment of the whitelist trust attributes as shown in FIG. 5a.

FIG. 5c is a schematic view of a security infrastructure for implementing another embodiment of the whitelist trust attributes as shown in FIG. 5a.

FIGS. 7a-7d are illustrations of various computer components associated with memory injection detection.

DETAILED DESCRIPTION

Reference will now be made in detail to the accompanying drawings, which at least assist in illustrating various pertinent embodiments of the new technology provided for by the present disclosure.

Figure 1:
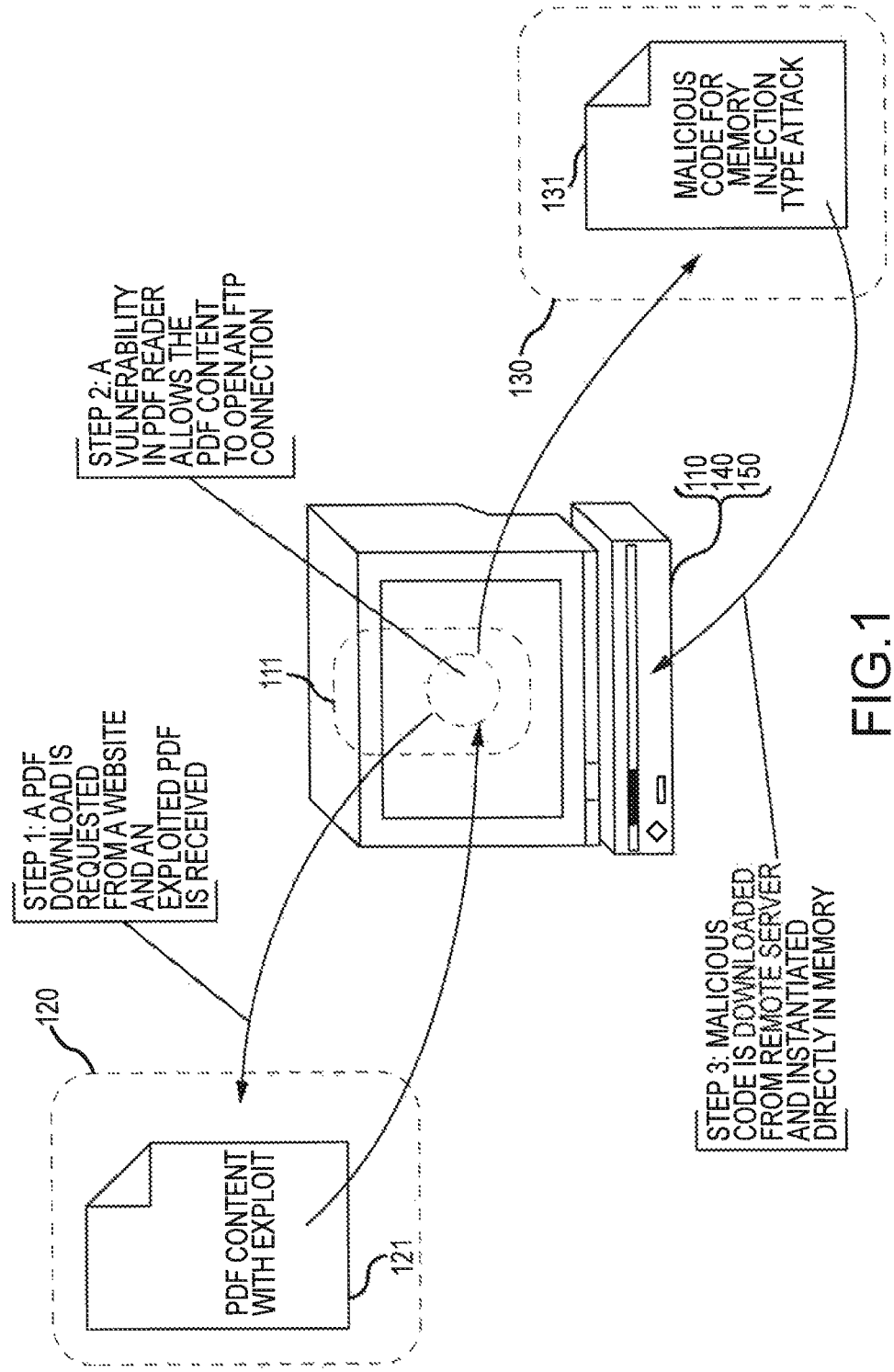
FIG. 1 is a schematic illustration of an exploitation of a PDF reader application vulnerability resulting in a memory injection onto the memory of a computer.

FIG. 1 illustrates steps in a simplified illustration of exploitation of an application vulnerability that results in malware being introduced to storage and potentially executed on a target computer. In the illustration, the vulnerable application is a portable document format (PDF)

reader application 111. The PDF reader application 111 executes on a computer 110 having file storage 140 (e.g., a hard disk drive) and memory 150 (e.g., Random Access Memory or "RAM"). The PDF reader application 111 loads PDF content 121 from a web server 120 (or from some other source). Although it is typically unrecognized by the user, PDF content 121 may include an exploit (e.g., code, data or other information) that exploits vulnerability in PDF reader application 111 to perform actions that further the malware's objective. In the illustration of FIG. 1, a vulnerability in PDF reader application 111 allows the exploit to open an ftp connection to server 130 that acts as a source of malicious code 131. In general, server 130 may be a repository specifically provided to host the malicious code or may be some other computer that has been previously compromised and acts as a transmission vector. An advantage of strategies such as illustrated in FIG. 1, at least from the malware's perspective, is that there are numerous avenues to introduce the malicious code into storage accessible to the target (here, computer 110). In general, the software is easy to write and directly accomplishes the hacker's objective. As a practical matter, the hacker can often place the malicious code in, and subsequently execute from, any of a variety of storage accessible to the computer 110.

Figure 2:
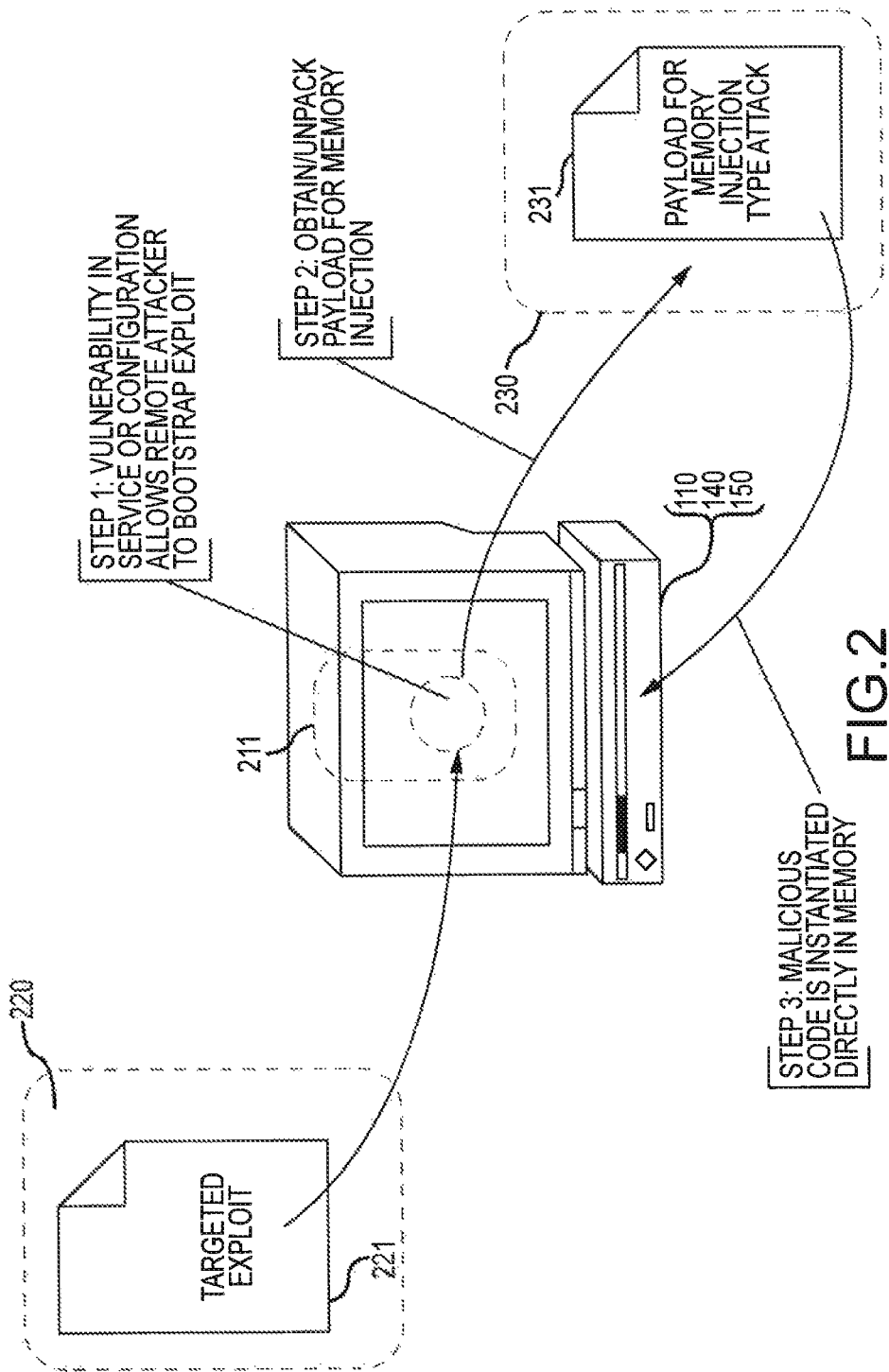
FIG. 2 is a schematic illustration of an exploitation of a generalized application vulnerability resulting in a memory injection onto the memory of a computer.
Figure 3A:
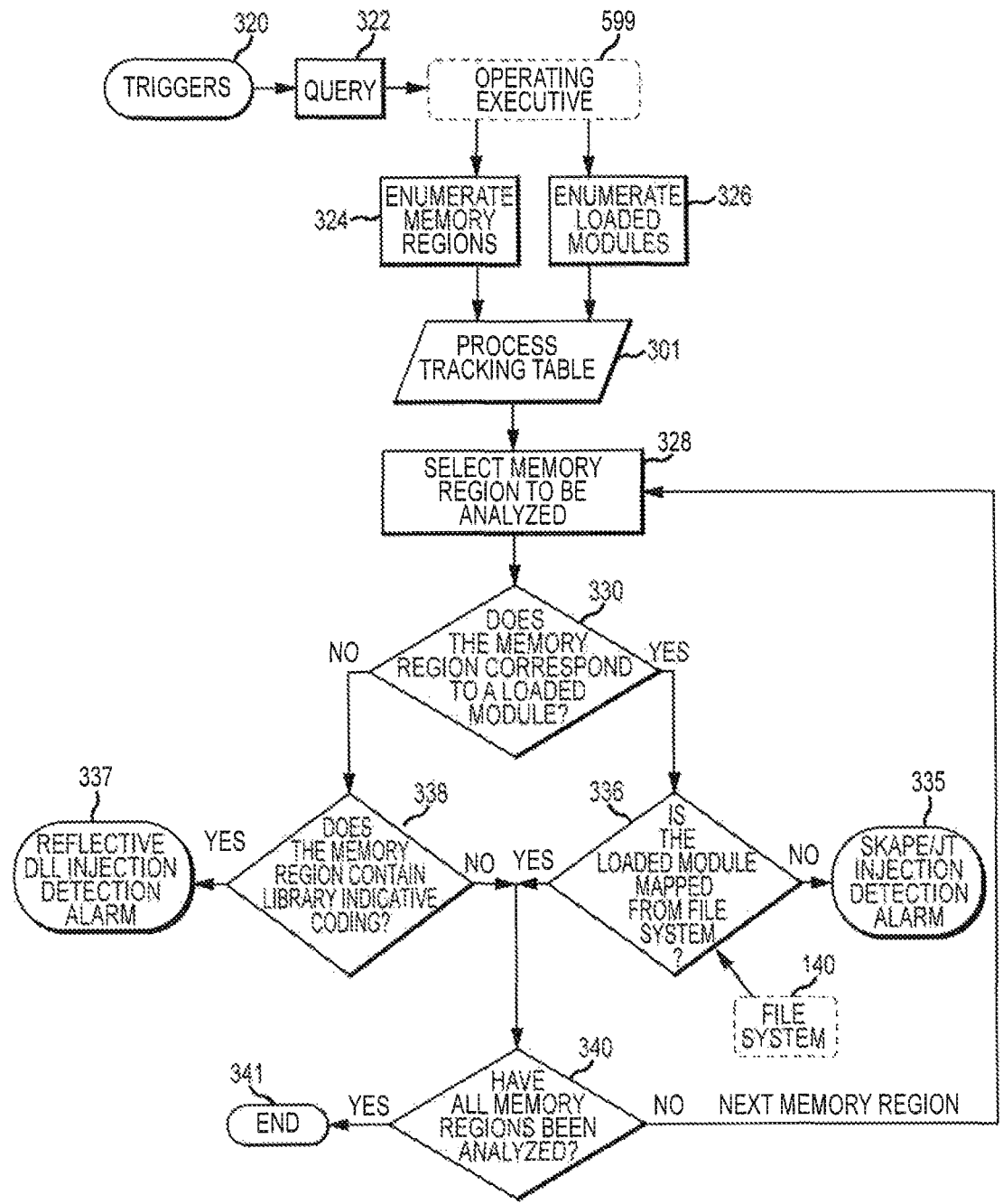
FIGS. 3a-3c are illustrations of a process flow of methods useful for memory injection detection.
Figure 3B:
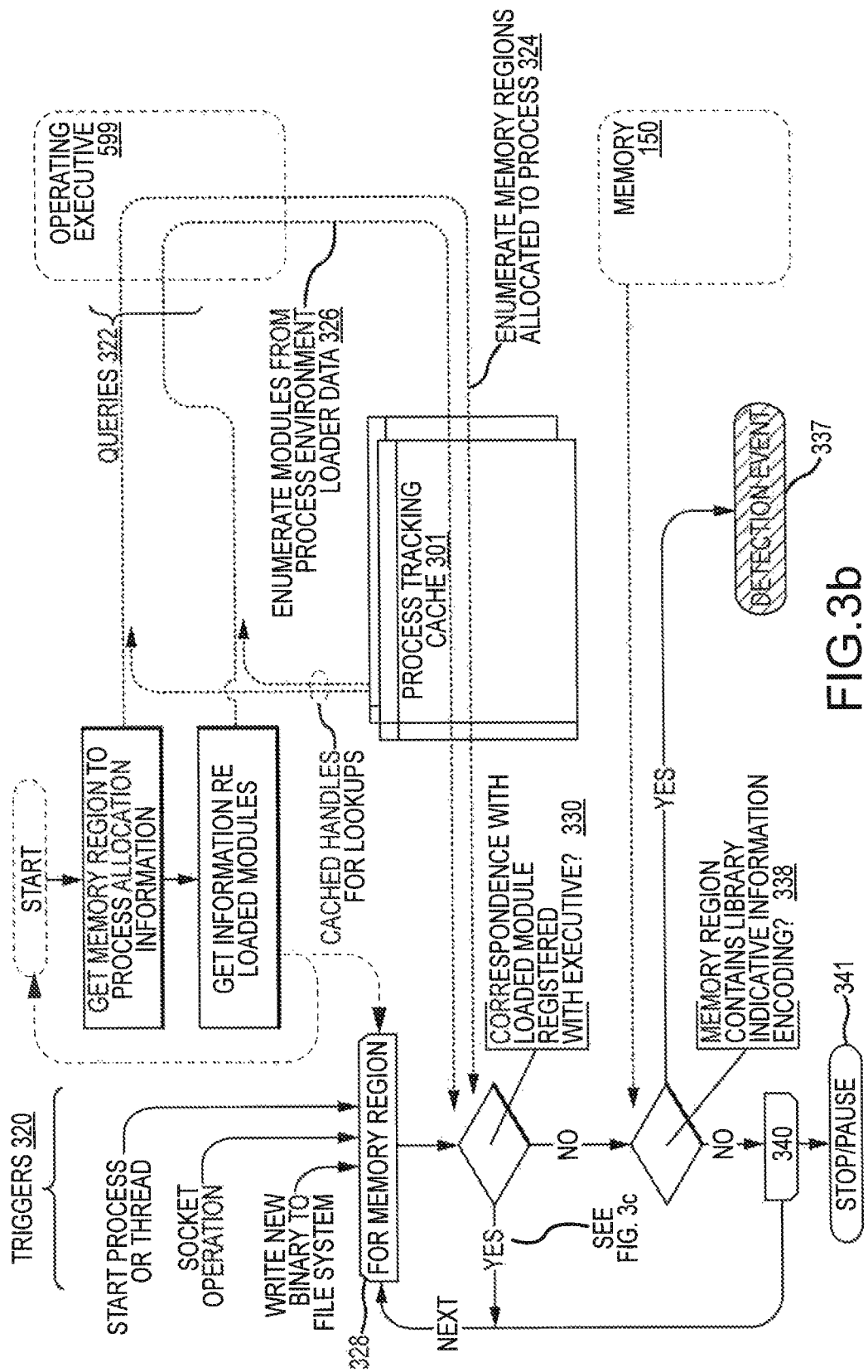
Figure 3C:
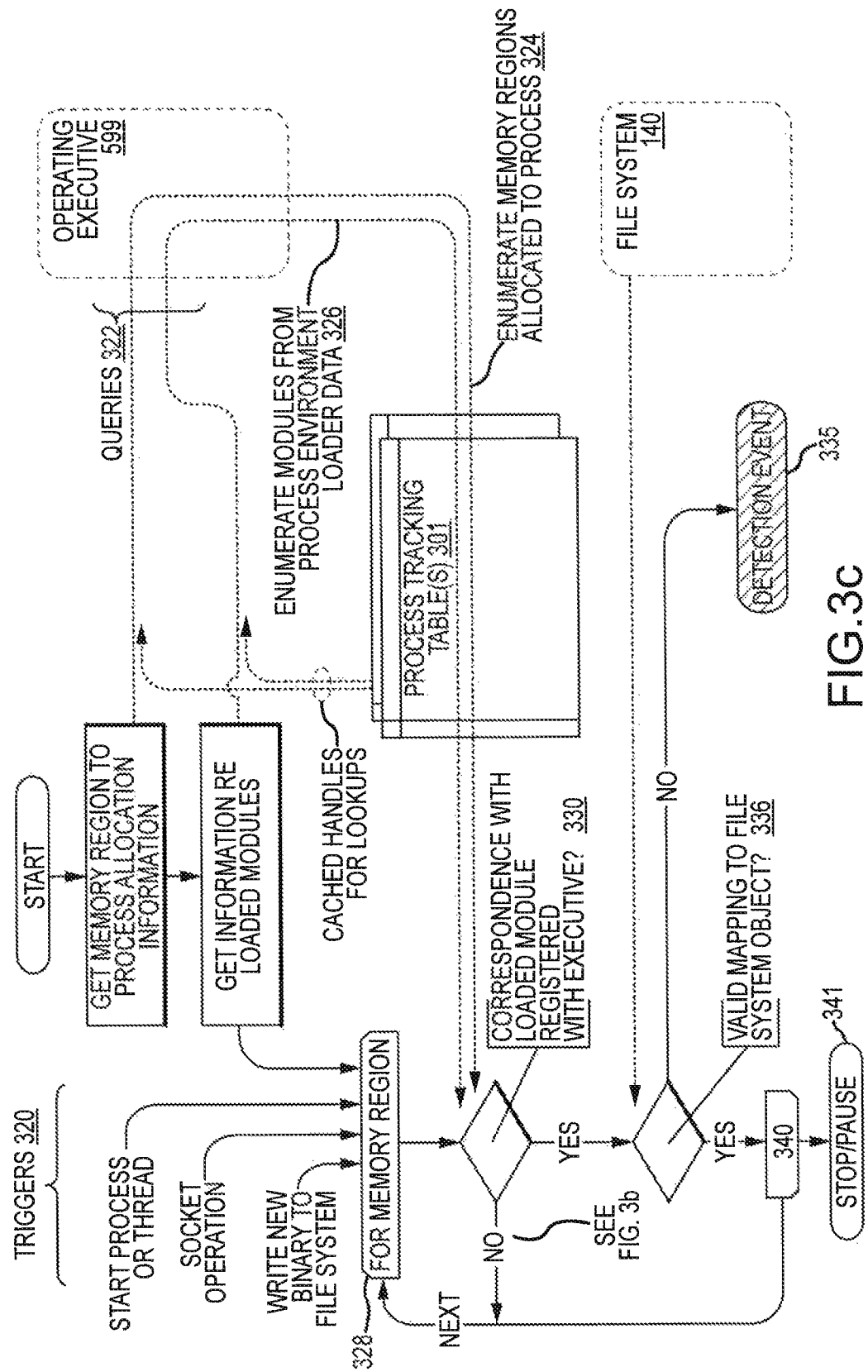

Turning now to FIG. 2, a more general exploitation of an application vulnerability is illustrated. In the illustration, the vulnerable application is a web content reader application 211. In the illustration, reader application 211 executes on computer 110 and, at some point loads exploited web content 221 from a web server 220 (or from some other source). Although it is typically unrecognized by the user of computer 110, web content 221 may include an exploit (e.g., code, data or other information) that exploits vulnerability in reader application 211 to perform actions that further the malware's objective. In the illustration of FIG. 2, a vulnerability in reader application 211 allows the exploit to open an ftp connection to malicious server 230 that acts as a source of malicious code 231. In general, malicious server 230 may be a repository specifically provided to host the malicious code or may be some other computer that has been previously compromised and acts as a transmission vector. An advantage of strategies such as illustrated in FIG. 2, at least from the malware's perspective, is that there are numerous avenues to introduce the malicious code into storage accessible to the target (here, computer 110). In general, the software is easy to write and directly accomplishes the hacker's objective. As a practical matter, the hacker can often place the malicious code in, and subsequently execute from, any of a variety of storage accessible to the computer 110. Persons of ordinary skill in the art will appreciate the simplified, though nonetheless illustrative, depictions of FIGS. 1 and 2 as representative of a wide range of memory injection type exploits, such as (for example and without limitation) those reflective DLL injection and Skape/JT type memory injection attacks (e.g., due to the memory injection techniques described by authors known by monikers Skape and JT (see Skape and JT, *Remote Library injection,* 2004), and those described by Fewer (see Fewer, *Reflective DLL Injection,* 2008)) referenced herein. As used herein, "memory injection" means unauthorized and/or malicious executable code that has been inserted into the address space of one or more processes executing on a computer system. Examples of memory injection techniques include, among others.

Turning now to FIGS. 3*a-e*, one embodiment of a computer program for detection of memory injection attacks is illustrated. In the illustrated embodiment, one or more trigger(s) 320 trigger the computer program to query 322 an operating executive 599. Triggers 320 may include the start of a new process or thread, the start of a socket operation, the writing of information to the file system, and/or the expiration of a polling timer, among others. In response to the query 322, the operating executive 599 enumerates 326, 324 loaded modules 170 (see FIG. 7*b*) and memory regions 160 (see FIG. 7*c*), thereby populating entries in one or more process tracking table(s) 301. Enumerating the loaded modules 170 may include populating entries in the process tracking table 301. These entries may include loaded module address information such as the start address, end address, and/or size of each loaded module 170 in the address space of memory 150, among others. Similarly, enumerating the memory regions 160 may include populating entries in the process tracking table 301. These entries may include memory region address information such as the start address, end address, and/or size of each memory region in the address space of memory 150. Because the information related to the memory regions 160 is derived from the operating executive kernel, this information may be less susceptible to malicious altering than information derived from the user space. Thus, the entries related to the memory regions 160 in the process tracking table 301 may provide a basis of comparison to facilitate detection of memory injection attacks.

The computer program, in process block 328, selects a first memory region from the process tracking table 301. The computer program then determines, in decision block 330, whether a module listed in the process tracking table 301 corresponds to the first memory region. In the illustrated embodiment, the start and end addresses of each listed module may be compared to the start and end addresses of the first memory region to determine if a module corresponds to the first memory region. If a module spans the first memory region, or partially overlaps the first memory region, then the module corresponds to the first memory region. Conversely, if a module lies completely outside of the first memory region, then the module does not correspond to the first memory region. If a module listed in the process tracking table 301 corresponds to the first memory region, then the computer program checks, in decision block 336, whether that corresponding module is mapped to the file system 110. If the corresponding module is not mapped from the file system 110, then the computer program generates a Skape/JT injection detection alarm 335. If, on the other hand, the corresponding module is mapped from the file system 110, then the computer program continues to decision block 340.

Returning now to decision block 330, if none of the modules listed in the process tracking table 301 correspond to the first memory region, then the computer program continues to decision block 338. In decision block 338 the computer program determines whether the first memory region contains library indicative coding (e.g., an executable). If the first memory region contains library indicative coding, then the computer program generates a Reflective DLL injection detection alarm 337. If, on the other hand, the first memory region does not contain library indicative coding, then the computer program continues to decision block 340.

In decision block 340, the computer program determines whether all the memory regions 160 listed in the process tracking table 301 have been analyzed. If there is at least one memory region listed in the process tracking table 301 that has not yet been analyzed, then the computer program selects the next memory region to be analyzed, restarting at process block 328. If all of the memory regions 160 listed in the process tracking table 301 have been analyzed, the process is complete (as represented by block 341).

Figure 4:
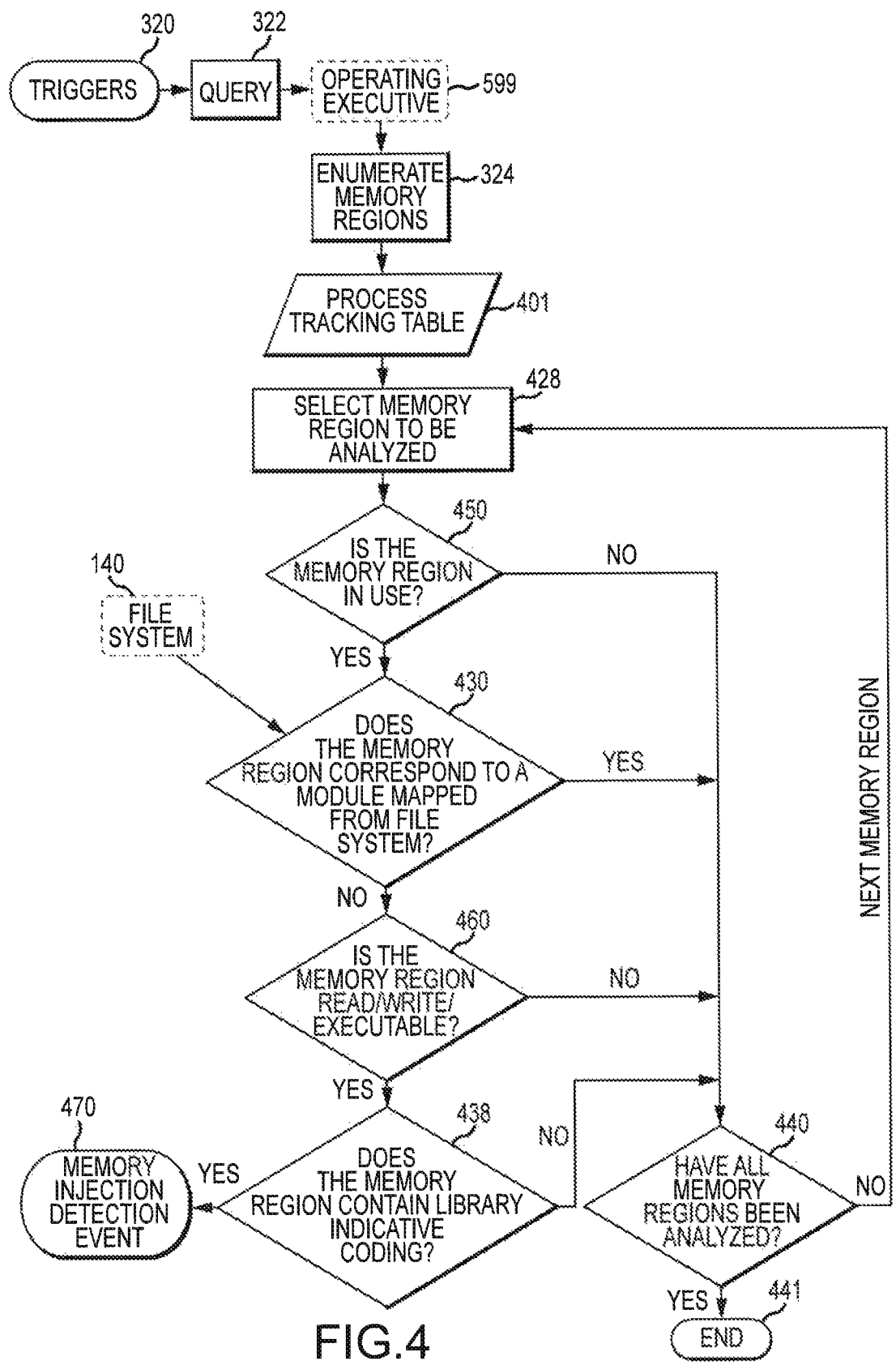
FIG. 4 is an illustration of a process flow of other methods useful for memory injection detection.

Turning now to FIG. 4, another embodiment of a computer program for detection of memory injection attacks is illustrated. In the illustrated embodiment of FIG. 4, as described above with respect to FIGS. 3a-c, one or more trigger(s) 320 trigger the computer program to query 322 an operating executive 599. In response to the query 322, the operating executive 599 enumerates 324 memory regions 160, thereby populating entries in one or more process tracking table(s) 401. Enumerating the memory regions 160 may include populating entries in the process tracking table 401 that indicate the start address, end address, and/or size of each memory region in the address space of memory 150.

The computer program, in process block 428, selects a first memory region from the process tracking table 401. The computer program then determines, in decision block 450, whether the first memory region is in use by checking whether the first memory region is committed memory. If the first memory region is not committed memory, then it is not in use, and the computer program proceeds to decision block 440. Conversely, if the first memory region is committed memory, then the computer program determines, in decision block 430, whether the first memory region corresponds to a module that is mapped from the file system 140.

If the first memory region corresponds to a module that is mapped from the file system 140, then the computer program proceeds to decision block 440. If, on the other hand, the first memory region does not correspond to any module that is mapped from the file system 140, then the computer program determines, in decision block 460, whether the first memory region is a read/write/executable memory region or was initially allocated as a read/write/executable memory region. If the first memory region is not a read/write/executable memory region, then program proceeds to decision block 440. Conversely, if the first memory region is a read/write/executable memory region, then the computer program determines, in decision block 438, whether the first memory region contains library indicative coding.

If the first memory region contains library indicative coding, then the computer program generates a DLL injection detection alarm 470. Conversely, if the first memory region does not contain library indicative coding, then the computer program determines, in block 440, whether all the memory regions 160 listed in the process tracking table 401 have been analyzed. If there is at least one memory region listed in the process tracking table 401 that has not yet been analyzed, then the computer program selects the next memory region to be analyzed, restarting at process block 428. If all of the memory regions 160 listed in the process tracking table 401 have been analyzed, the process is complete (as represented by block 441).

Figure 5A:
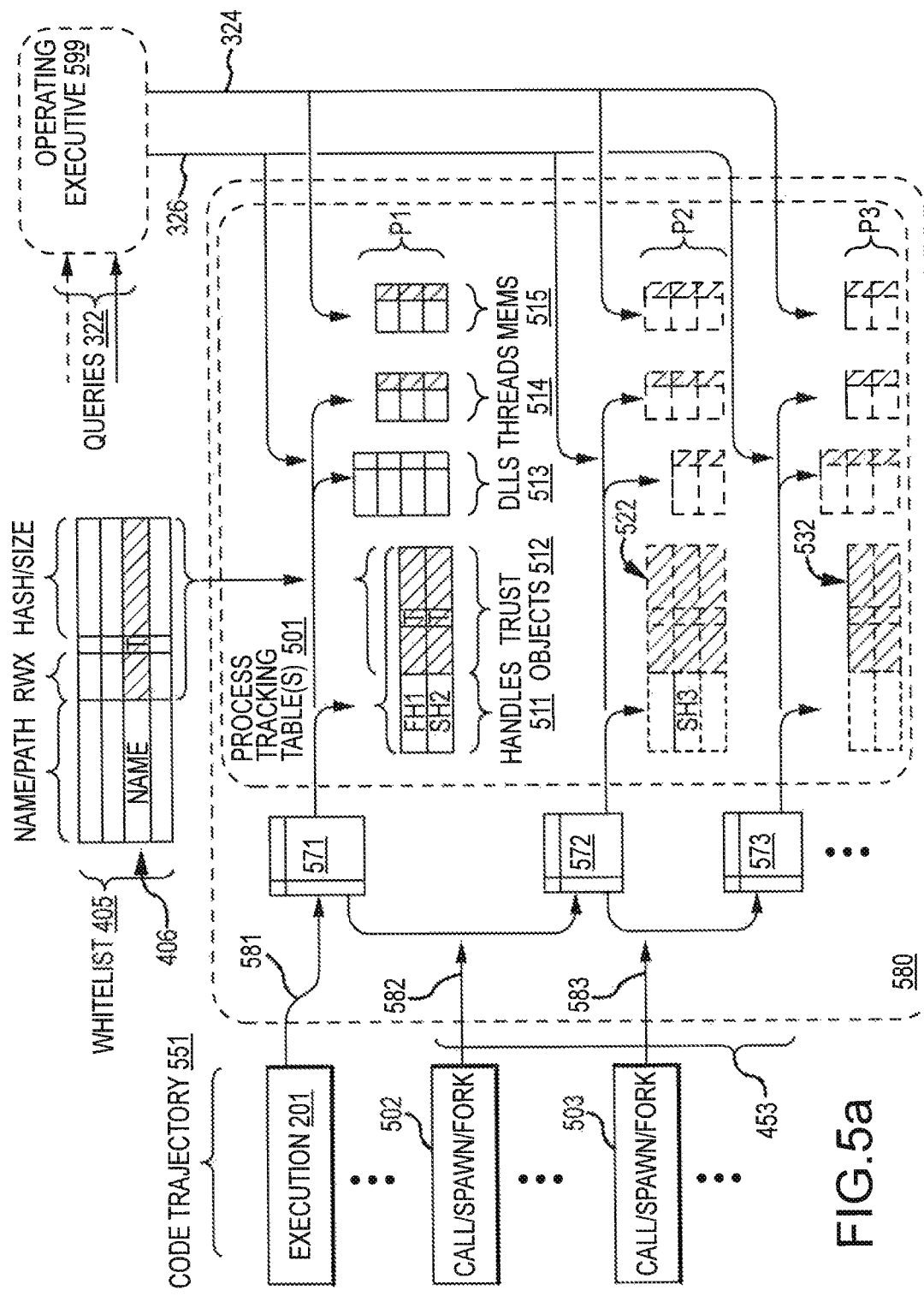
FIG. 5a is a schematic view of one embodiment of a process tracking table, including the propagation of whitelist trust attributes along a code trajectory and the enumeration of memory regions and loaded modules in accordance with some embodiments of memory injection detection.
Figure 5B:
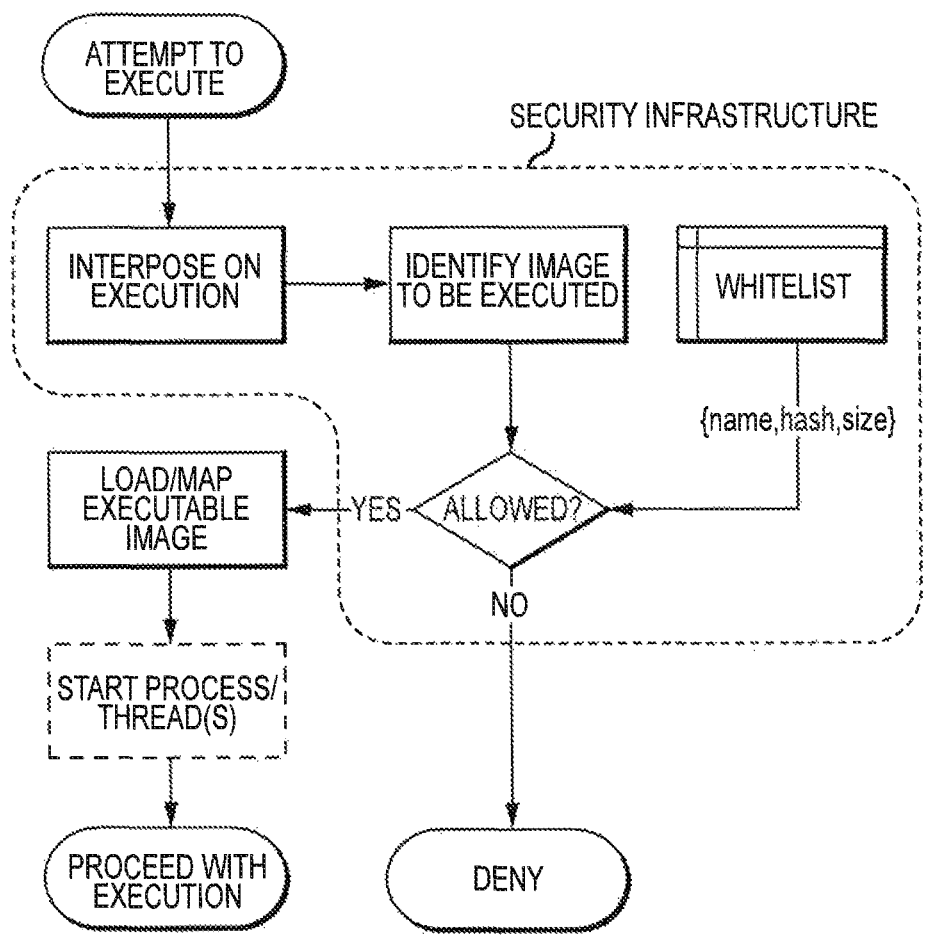
Figure 5C:
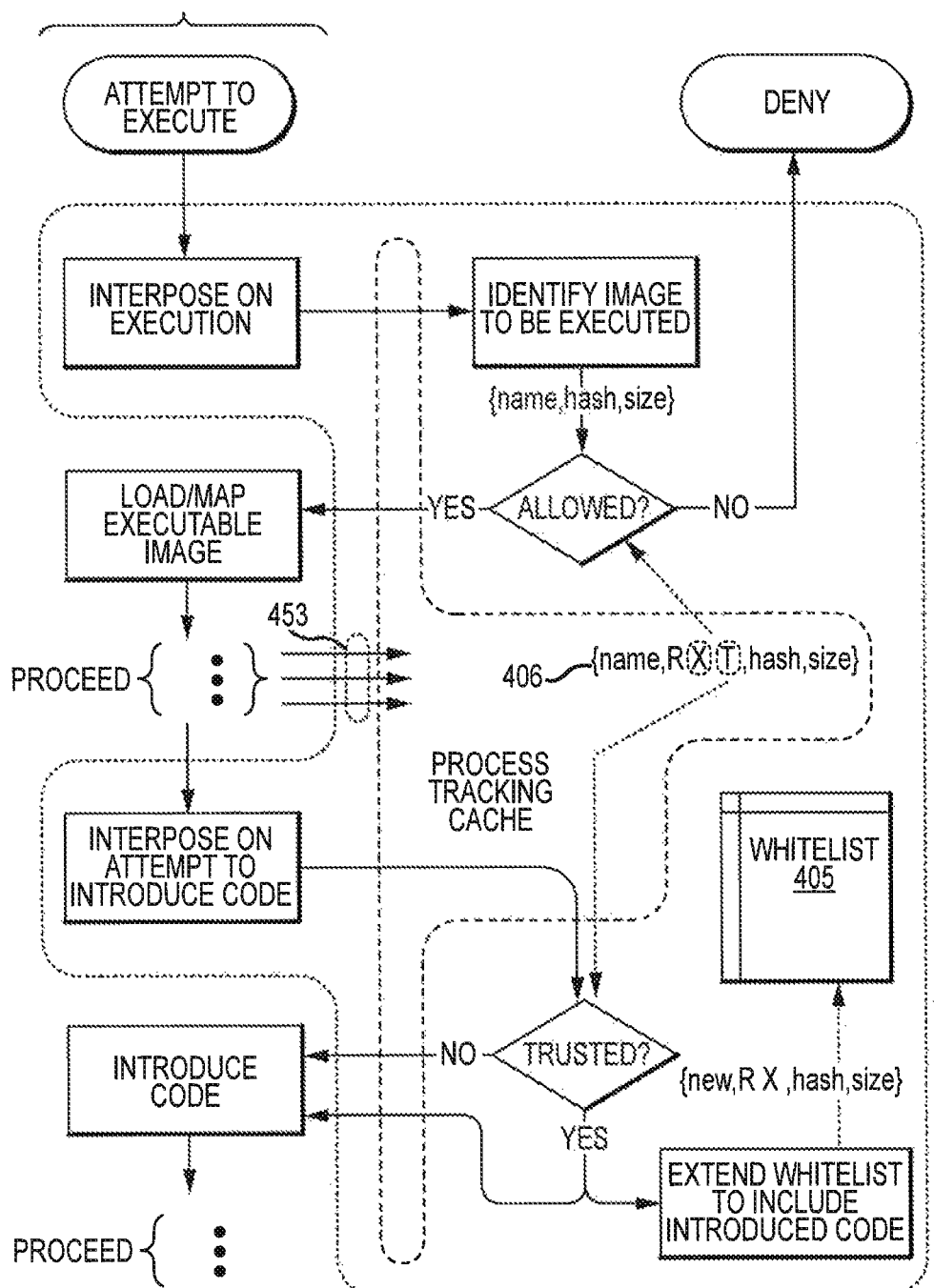

Turning now to FIGS. 5a-c, another embodiment of a computer program for detection of memory injection attacks is illustrated. More specifically, FIG. 5a illustrates introduction of memory allocation and loaded module information retrieved from an operating executive 599 (e.g., from an operating executive, virtualization system, hypervisor or some combination thereof) for use in a comprehensive process tracking table 501 that facilitates memory injection attack detection, interdiction and/or mitigation solutions as well as application whitelist execution controls. Note that while whitelisting security solutions provide a useful descriptive and illustrative context for some embodiments, other embodiments in accordance with the present disclosure need not implement whitelisting solutions.

Using techniques illustrated in FIG. 5a, whitelisting security infrastructures in accordance with some embodiments of the present disclosure effectively cache whitelist information and protection attributes in association with a runtime set of identifiers (e.g., name/pathname, handle, dll and/or thread identifiers) associated with the code image 571 for which execution is initially attempted (201). In particular, entry 406 of whitelist 405 corresponds to execution (attempted at 201) of an image identified using file/pathname (with confirmed hash and size attributes). The security infrastructure then leverages those identifiers to recognize the association of pertinent interposed-upon system calls with code image 571 and to propagate protection attributes cached for code image 571 to additional processes invoked 502, 503 along code trajectory 551. By accumulating the relevant identifiers and storing whitelist-sourced trust objects 512 in association therewith, process tracking tables 501 provide a useful kernel-resident data structure (that is not exposed to user code access) against which the whitelisting security infrastructure may efficiently check for protection attributes.

An initial succession 582, 583 of interposed-upon call flows 453 are illustrated in correspondence with attempts to execute further images 572, 573 along code trajectory 551 (via call/spawn/fork/exec 502, 503). Capture and recording of the dynamically created handles (e.g., FH1 and SH2) allows interposition mechanisms 580 of the whitelisting security infrastructure to associate the interposed-upon system calls with execution of code image 571 and to propagate protection attributes encoded in trust objects 512 to trust objects 522 maintained in association with handles, dlls and thread identifiers used by the operating system to identify a new process P2 (and its associated dlls and threads) that execute code image 572.

Likewise, in an execution sequence of code image 572 that seeks to initiate yet another process by (i) opening a file containing yet another code image 573, (ii) mapping the code image to memory and (iii) creating the new process P3, the capture and recording of runtime identifiers (e.g., file handles, section handles and/or other identifiers) associated with execution of code image 572 allows interposition mechanisms 580 of the whitelisting security infrastructure to recognize the system calls that constitute call/spawn/fork/exec 503 and to appropriately propagate whitelist-sourced protection attributes to the resulting process P3, its threads and dlls. For example, in the illustration of FIG. 6, an interposed upon 583 system call (e.g., an NTCreateProcess system call) is matched with trust objects 522 based on an identifier (e.g., section handle SH3) captured and tracked in the course of process P2. Based on that match contents of trust object(s) 522 are further propagated to process tracking table entries for process P3. For example a trust-changes type trust object associated with process P2 may allow the whitelist to be extended to include a trust-execute type trust object to be associated with process P3. The process tracking table(s) 501 associated with the above described whitelisting security infrastructure may also facilitate detection of memory injection attacks. Specifically, the process tracking table 501 may facilitate enumeration and/or analysis of memory regions 160, as described above with respect to FIGS. 3a-c and FIG. 4.

In the illustrated embodiment of FIG. 5a, process tracking tables 501 are maintained separately from (though generally in correspondence with) process tables maintained by an operating system, hypervisor or other execution environment. Interposition and process tracking tables 501 may operate by either hooking events in the operating system kernel without complicity or cooperation from the operating system, or by registering with the operating system to be notified when process are created, deleted, or modified. In other embodiments, state maintained in process tracking tables 501 (and indeed interpositioning) may be integrated with facilities of an operating system, hypervisor or execution environment. Indeed, in some embodiments, process tracking and/or interposition may be based on facilities or capabilities of a virtualization system.

Figure 6:
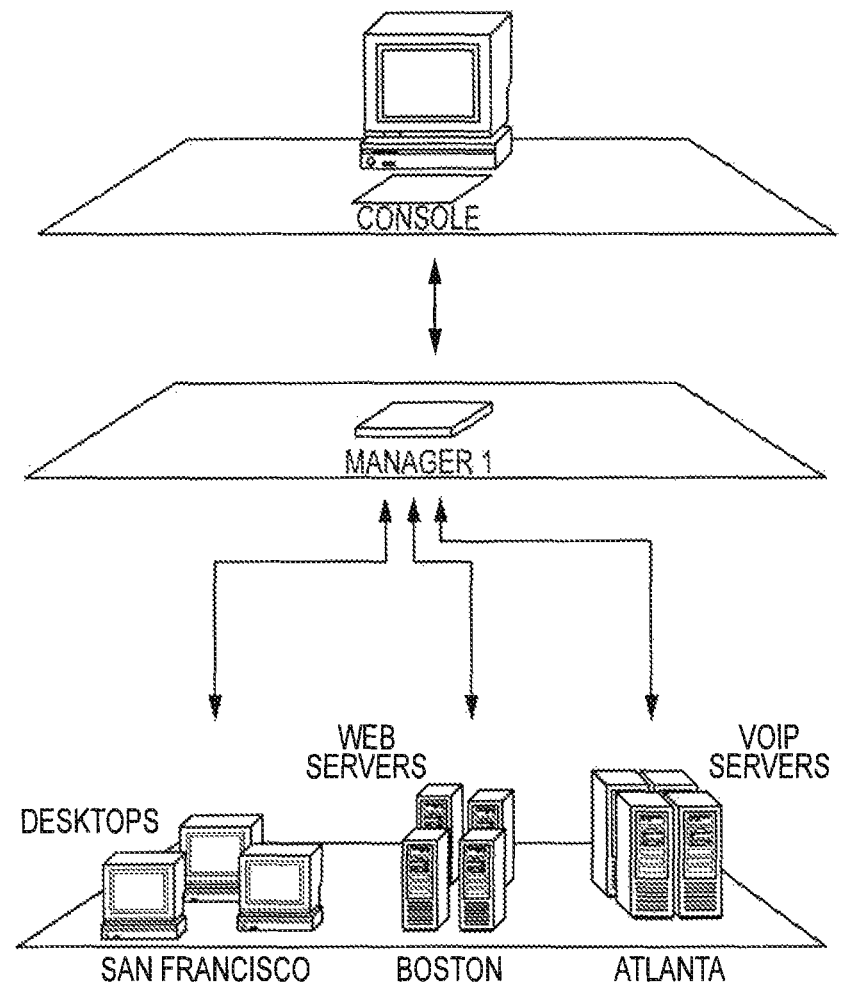
FIG. 6 is an illustration of a three-tiered console/manager/client architecture provided in some implementations of some security solutions in accordance with the present disclosure.

FIG. 6 illustrates one embodiment of a three-tiered console/manager/client architecture to facilitate securing and managing individual computing platforms as part of an enterprise network. In one embodiment, the system includes a plurality of computing platforms, including end-user platforms (e.g., desktops, web servers, and/or Voice-Over-Internet Protocol (VOIP) servers), a manager appliance connected to the computing platforms, and a console appliance connected to the manager. In one embodiment, each computing platform has a respective security module (i.e., "client") residing therein that is in constant or almost constant communication, via a network, with the manager. The network may be any suitable network known to those having ordinary skill in the art, including wired and wireless networks. In the illustrated embodiment, the clients enforce the security policies (e.g., the memory injection detection and/or whitelist security policies disclosed herein) for the computing platforms while the manager monitors the operation of the clients and provides secure, centralized communication to the clients. In one embodiment, the console, which provides the only available access to the manager, allows an enterprise administrator to log on to the manager for purposes of monitoring the computing platforms and implementing policy changes (e.g. revised whitelists), software upgrades, security event reporting (e.g. memory injection alarms), and the like. In the illustrated embodiment, from the console, an administrator may view all information about the clients as well as issue commands to each client as needed.

Figure 7A:
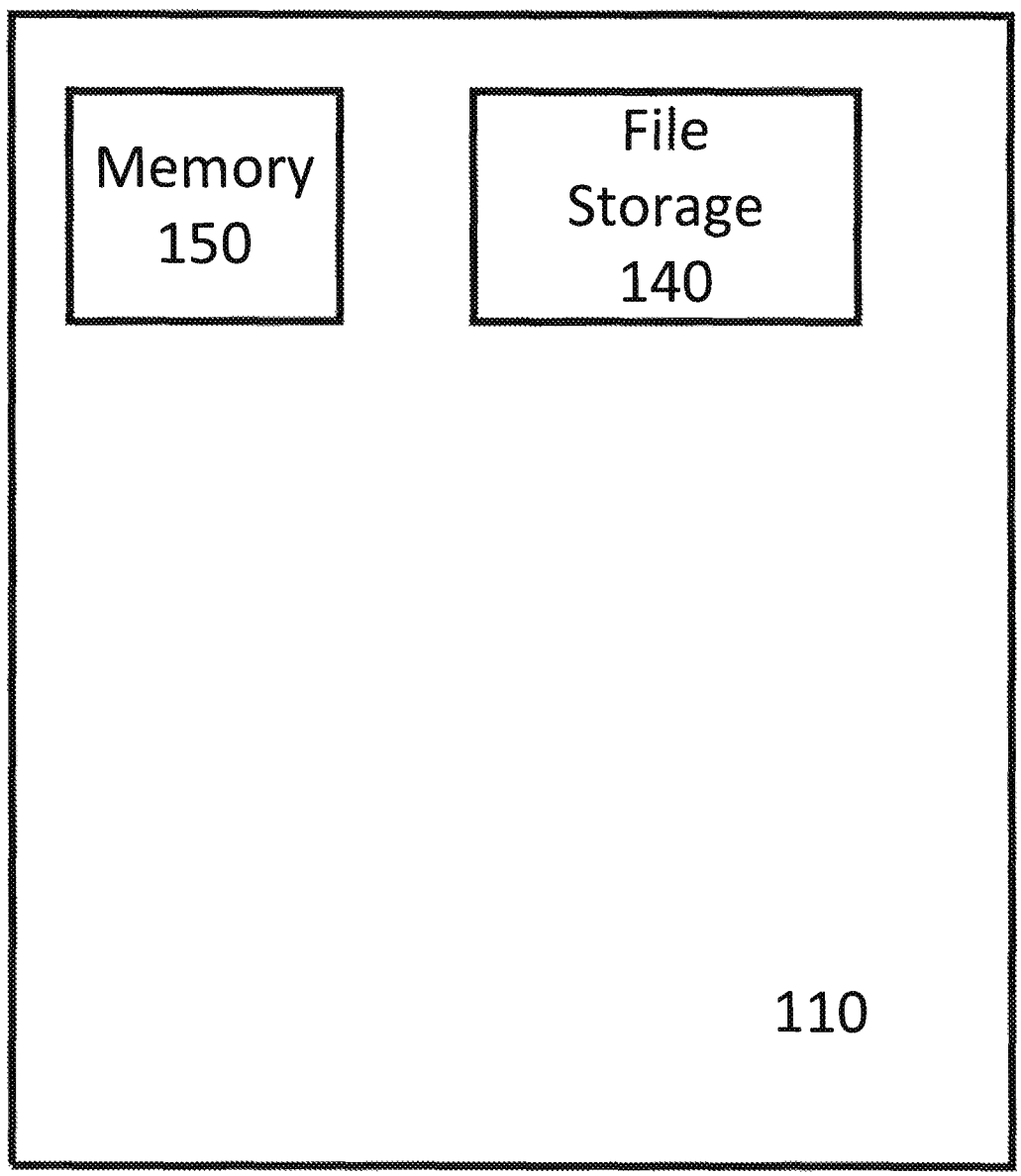
Figure 7B:
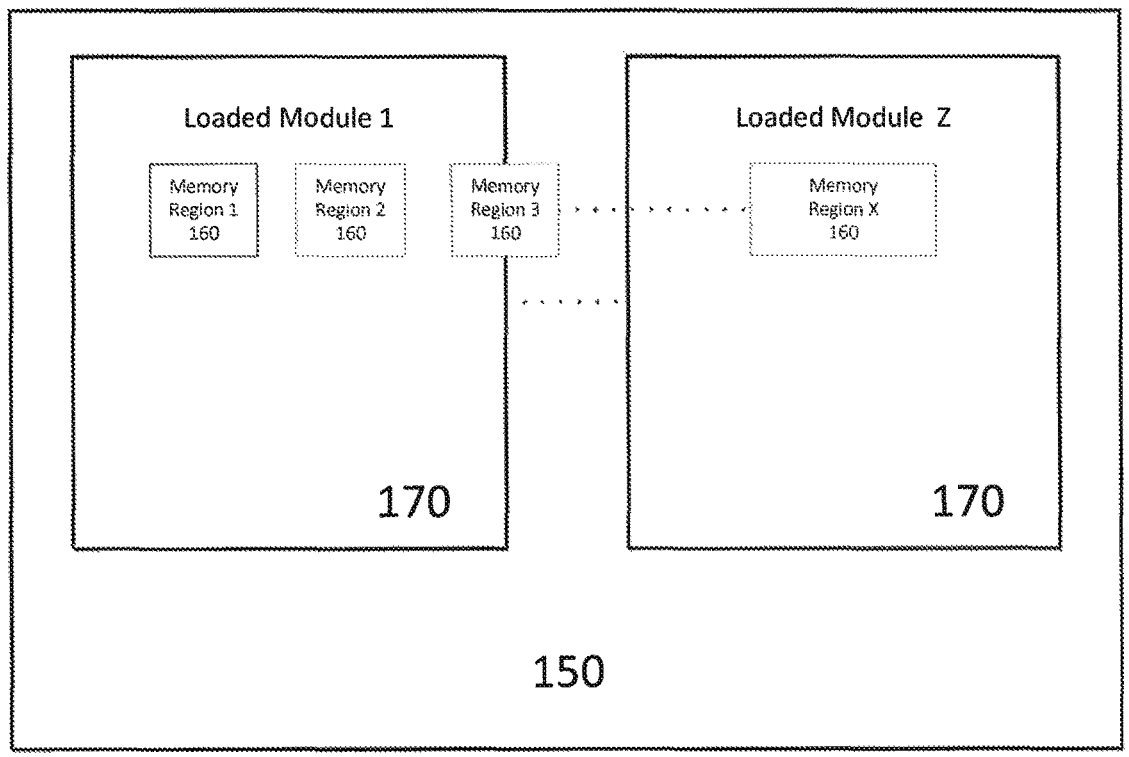
Figure 7C:
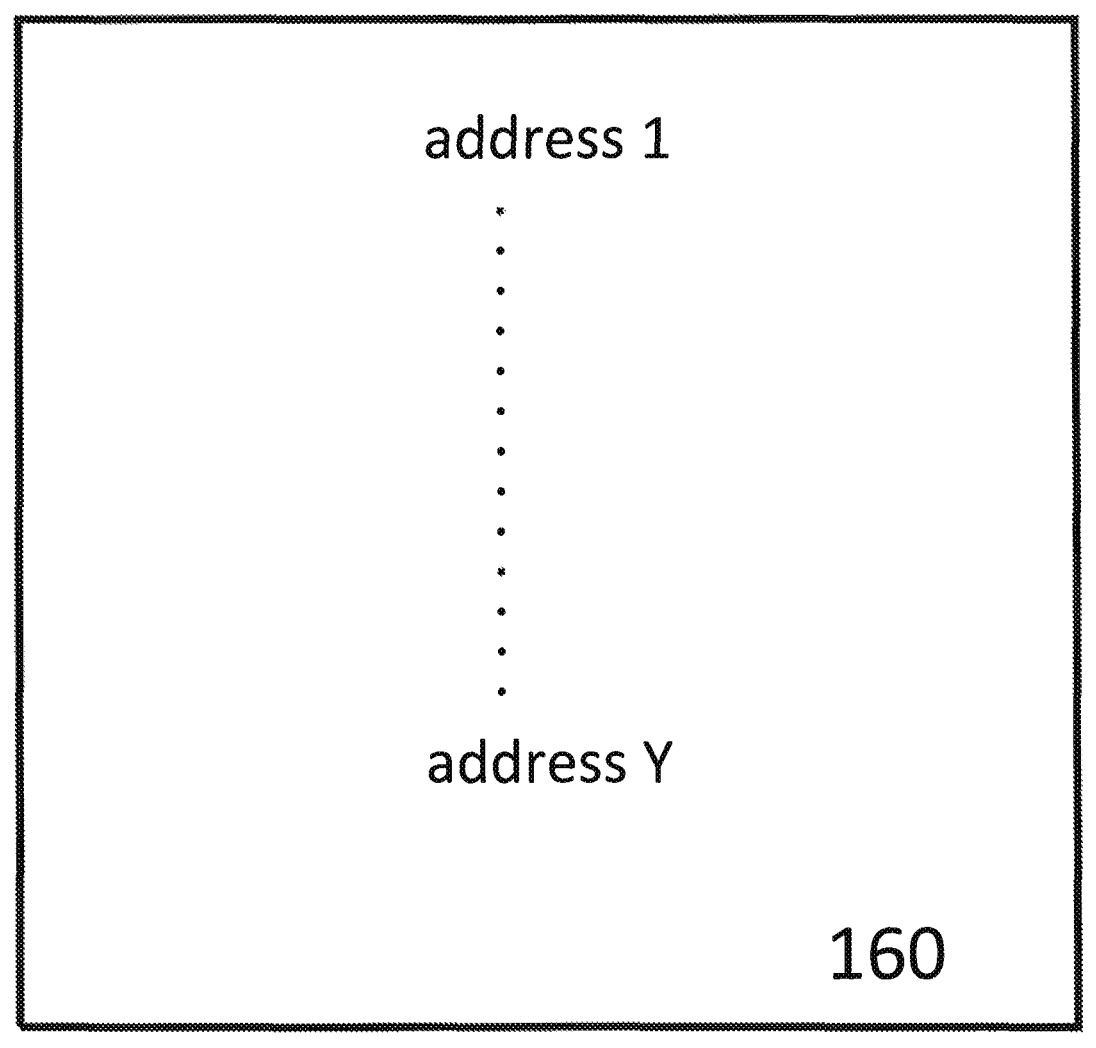
Figure 7D:
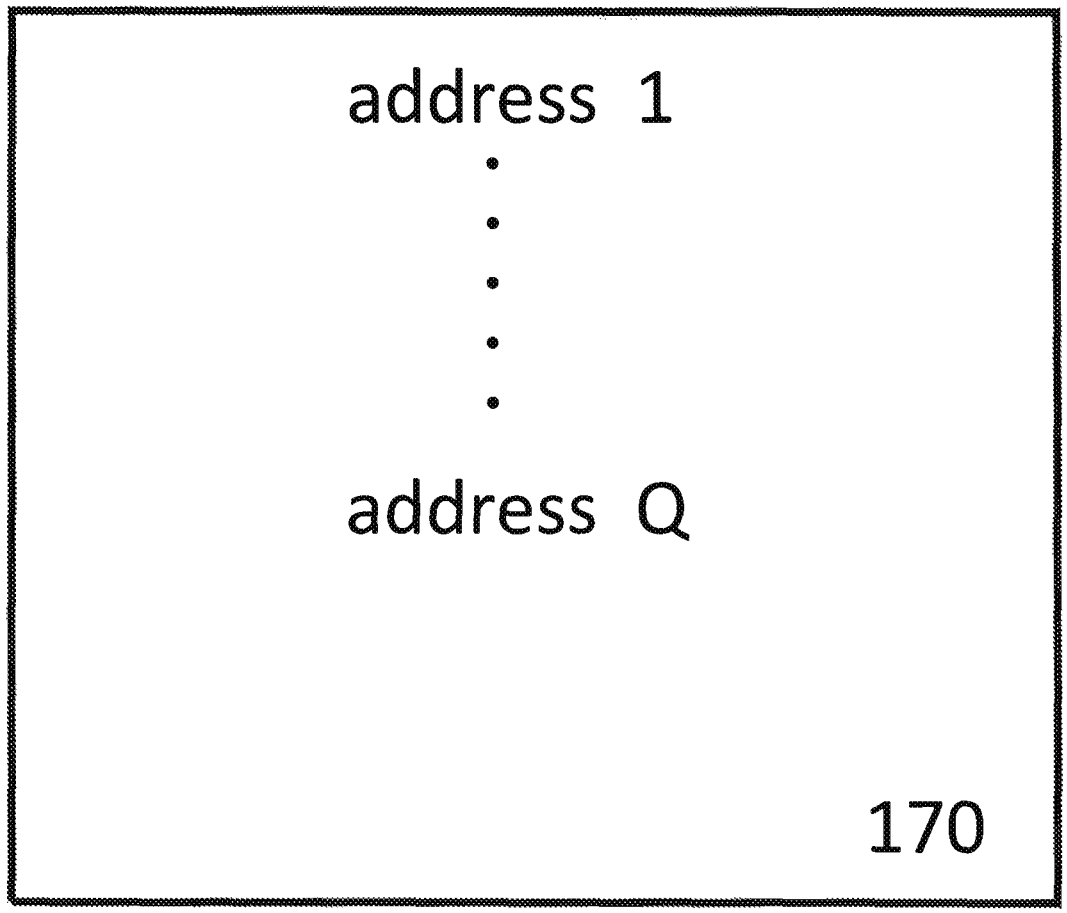

Turning now to FIGS. 7*a-d*, various apparatuses associated with memory injection detection are illustrated. More specifically, FIG. 7*a* schematically illustrates one embodiment of the computer system 110 including the memory 150 and the file storage 140. As shown in FIG. 7*b*, the memory 150 may include loaded modules 170 and memory regions 160. A memory region 160 may comprise a number of discrete addresses in an address space of memory 150. As shown in FIG. 7*c*, for example, a memory region 160 may include any number of sequential addresses. Similarly, as shown in FIG. 7*d*, a loaded module 170 may comprise any number of discrete addresses in an address space of memory 150. As shown in FIG. 7*d*, for example, a loaded module 170 may include any number of sequential addresses. The addresses of a loaded module 170 may span the addresses of more than one memory region 160, and furthermore the addresses of a loaded module 170 may overlap the addresses of a memory region 160 (as shown in FIG. 7*c*).

While the invention(s) is (are) described with reference to various implementations and embodiments, it will be understood that these embodiments are illustrative and that the scope of the invention(s) is not limited to them. Many variations, modifications, additions, and improvements are possible. Plural instances may be provided for components, operations or structures described herein as a single instance. In addition, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s). While various embodiments of the new technology described herein have been described in detail, it is apparent that modifications and adaptations of those embodiments will occur to those skilled in the art. However, it is to be expressly understood that such modifications and adaptations are within the spirit and scope of the presently disclosed technology.

What is claimed is:

1. A method comprising:
   (a) enumerating, based on a query of an operating executive of a computer system, a plurality of memory regions of an address space in memory of the computer system, thereby creating memory region address information; and
   (b) scanning memory of the computer system for a memory injection, wherein the scanning step comprises:
      (i) determining whether a first memory region of the plurality of memory regions corresponds to any of a plurality of loaded modules registered with the operating executive, wherein the determining step comprises:
         examining the plurality of loaded modules for loaded module address information; and
         comparing the memory region address information to the loaded module address information, wherein start and end addresses of each loaded module of the plurality of loaded modules are compared to start and end addresses of the first memory region; and
      (ii) wherein, when the first memory region does not correspond to any of the plurality of loaded, determining whether the first memory region contains library indicative coding, the first memory region does not correspond to any of the plurality of loaded modules when each loaded module from the plurality of loaded modules lies completely outside the start and end address of first memory region; and
      (iii) wherein, when the first memory region contains library indicative coding, generating a memory injection alarm.

2. The method of claim 1, wherein, when the first memory region corresponds to one of the plurality of loaded modules, determining whether that loaded module is mapped from a file system of the computer system.

3. The method of claim 2, wherein the memory injection alarm is a first memory injection alarm, and wherein, when the loaded module is not mapped from a file system of the computer system, generating a second memory injection alarm.

4. The method of claim 3, wherein the first memory injection alarm is indicative of a reflective dynamic link library memory injection.

5. A method comprising:
   (a) enumerating, based on a query of an operating executive of a computer system, a plurality of memory regions of an address space in memory of the computer system, thereby creating memory region address information; and (b) scanning memory of the computer system for a memory injection, wherein the scanning step comprises:
  (i) determining whether a first memory region of the plurality of memory regions corresponds to any of a plurality of loaded modules registered with the operating executive, wherein the determining step comprises:
    examining the plurality of loaded modules for loaded module address information; and
    comparing the memory region address information associated with the first memory region to the loaded module address information, wherein start and end addresses of each loaded module of the plurality of loaded modules are compared to start and end addresses of the first memory region; and
  (ii) wherein, when the first memory region corresponds to one of the plurality of loaded modules, determining whether that loaded module is mapped from a file system of the computer system, the first memory region does not correspond to that loaded module when that loaded module lies completely outside the start and end address of first memory region; and
  (iii) wherein, when the loaded module is not mapped from a file system of the computer system, generating a memory injection alarm.

6. The method of claim 5, wherein the scanning step comprises:
  determining whether the first memory region is in use by ensuring that it is committed memory; and
  wherein, when the first memory region is in use, determining whether the first memory region corresponds to any of the plurality of loaded modules.

7. The method of claim 5, wherein the scanning step comprises:
  determining whether the first memory region is at least one of a read, write, or executable region or was initially allocated as at least one of a read, write, or executable region; and
  wherein, when the first memory region is at least one of a read, write, or executable region or was initially allocated as at least one of a read, write, or executable region, determining whether the first memory region contains library indicative coding.

8. The method of claim 5, wherein the operating executive includes an operating system.

9. The method of claim 5, wherein the query comprises:
  obtaining a process handle for each process executing on the computer system; and
  based on the obtained process handle, querying the operating executive to obtain at least a respective base address and size for each of successive memory regions within the address space of the respective process.

10. The method of claim 9, wherein the querying step comprises: obtaining from the operating executive an identifier for the respective file system object, if any, from which content of a particular memory region is mapped.

11. The method of claim 9, wherein the process handle obtaining includes:
  maintaining a shadow process table in correspondence with start of new processes or threads; and accessing the maintained shadow process table.

12. The method of claim 9, wherein the process handle obtaining includes:
  accessing a process table maintained by the operating executive.

13. The method of claim 5, wherein the comparing step is performed at successive times during operation of the computer system.

14. The method of claim 5, comprising:
  at least for memory regions allocated to a given process, performing the comparing step in response to an event, wherein the event is at least one of:
    (i) start of a new process or thread;
    (ii) a network-facing socket operation;
    (iii) creation of a new binary on a file system; or
    (iv) the expiration of a polling timer.

15. The method of claim 5, wherein the query comprises walking a call stack.

16. The method of claim 5, further comprising: performing at least the comparing and the determining in kernel code.

17. The method of claim 5,
  wherein for at least some executions, the comparing is limited to those address space regions having a trust-execute protection object.

18. The method of claim 5, wherein the enumerating step comprises:
  enumerating, based on the query, the plurality of loaded modules, thereby creating loaded module address information.

19. The method of claim 5, wherein
  when a loaded module from the plurality of loaded modules spans the first memory region, or partially overlaps the first memory region, then the loaded module corresponds to the first memory region.

20. A security method for a computational system, the method comprising:
  querying an operating executive of the computational system to populate a data structure that enumerates regions of an address space allocated to processes executing on the computational system;
  querying the operating executive to populate a data structure that enumerates a set of loaded modules registered with the operating executive;
  comparing the enumerated address space regions against the enumerated set of loaded modules, the comparing comprising comparing start and end addresses of each loaded module of the set of loaded modules to start and end addresses of the enumerated address space regions;
  for those of the enumerated address space regions that correspond to a loaded module registered with the operating executive, checking for absence of a mapping from a file system object, the enumerated address space region from the enumerated address space regions does not correspond to a loaded module from the set of loaded modules when that loaded module lies completely outside the start and end address of the enumerated address space region; and
  responsive to detection of no mapping from a file system object, generating a detection event.

21. The method of claim 1, wherein the enumerating comprises populating entries in at least one process tracking table.

* * * * *

UNITED STATES PATENT AND TRADEMARK OFFICE
CERTIFICATE OF CORRECTION

| | | |
|---|---|---|
| PATENT NO. | : 9,734,333 B2 | Page 1 of 1 |
| APPLICATION NO. | : 13/841245 | |
| DATED | : August 15, 2017 | |
| INVENTOR(S) | : Daniel Teal | |

It is certified that error appears in the above-identified patent and that said Letters Patent is hereby corrected as shown below:

In the Claims

At Column 10, Line number 24 (Claim 1, Line 7), "(b) scanning memory of the computer system for a" should be -- (b) scanning the memory of the computer system for a --

At Column 10, Line number 40 (Claim 1, Line 23), "correspond to any of the plurality of loaded deter-" should be -- correspond to any of the plurality of loaded modules deter- --

At Column 10, Line number 46 (Claim 1, Line 29), "and end address of first memory region; and" should be -- and end address of the first memory region; and --

At Column 11, Line number 1 (Claim 5, Line 7), "(b) scanning memory of the computer system for a" should be -- (b) scanning the memory of the computer system for a --

At Column 11, Line number 23 (Claim 5, Line 29), "start and end address of first memory region; and" should be -- start and end address of the first memory region; and --

At Column 11, Line number 54 (Claim 10, Line 1), "The method of claim 9, wherein the querying step" should be -- The method of claim 9, wherein the query --

At Column 11, Line number 56 (Claim 10, Line 3), "tifier for the respective file system object, if any, from which" should be -- tifier for a respective file system object, if any, from which --

At Column 12, Line number 52 (Claim 20, Line 18), "from a file system object, the enumerated address space" should be -- from a file system object, an enumerated address space --

Signed and Sealed this
Third Day of October, 2017

Joseph Matal
*Performing the Functions and Duties of the*
*Under Secretary of Commerce for Intellectual Property and*
*Director of the United States Patent and Trademark Office*